United States Patent [19]
Foley et al.

[11] 3,776,485
[45] Dec. 4, 1973

[54] HOLDER FOR TRANSFERRING FISHING LINE TO REEL

[76] Inventors: Charles F. Foley, 3908 Merriam Rd., Minnetonka, Minn. 55343;
Charles D. McCarthy, Rt. No. 3, Box 217 BA, Wayzata, Minn. 55391

[22] Filed: Sept. 2, 1971

[21] Appl. No.: 177,403

[52] U.S. Cl.................................. 242/106, 43/25
[51] Int. Cl............................................. A01k 47/06
[58] Field of Search.................. 242/106, 84.3, 84.4, 242/84.41, 84.43, 84.5 R; 43/20, 22, 25

[56] References Cited
UNITED STATES PATENTS
3,026,059   3/1962   Demler........................... 242/106 X
2,993,661   7/1961   D'Arrigo............................ 242/106
2,848,778   8/1958   Plummer............................ 43/25 X
3,199,242   8/1965   Holmstrom............................ 43/25

*Primary Examiner*—George F. Mautz
*Assistant Examiner*—Edward J. McCarthy
*Attorney*—Ralph L. Dugger et al.

[57] ABSTRACT

A fish line spool holder for attachment directly to a fishing rod and for holding a new spool of line from which the line can be removed and wound directly onto a fishing reel so that the line will properly wind onto the reel.

5 Claims, 4 Drawing Figures

PATENTED DEC 4 1973
3,776,485
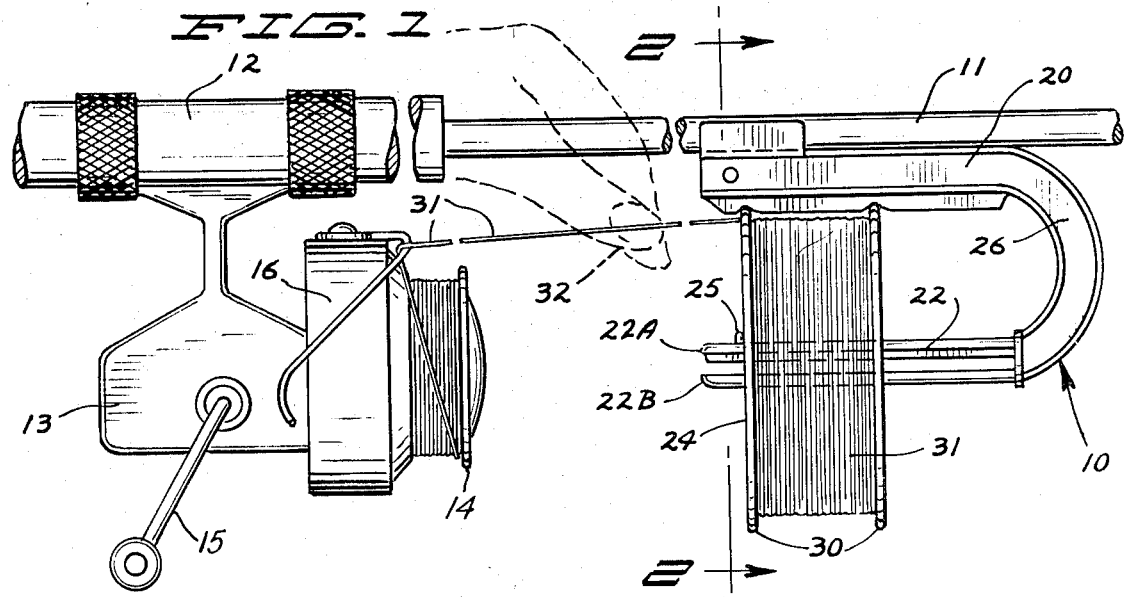
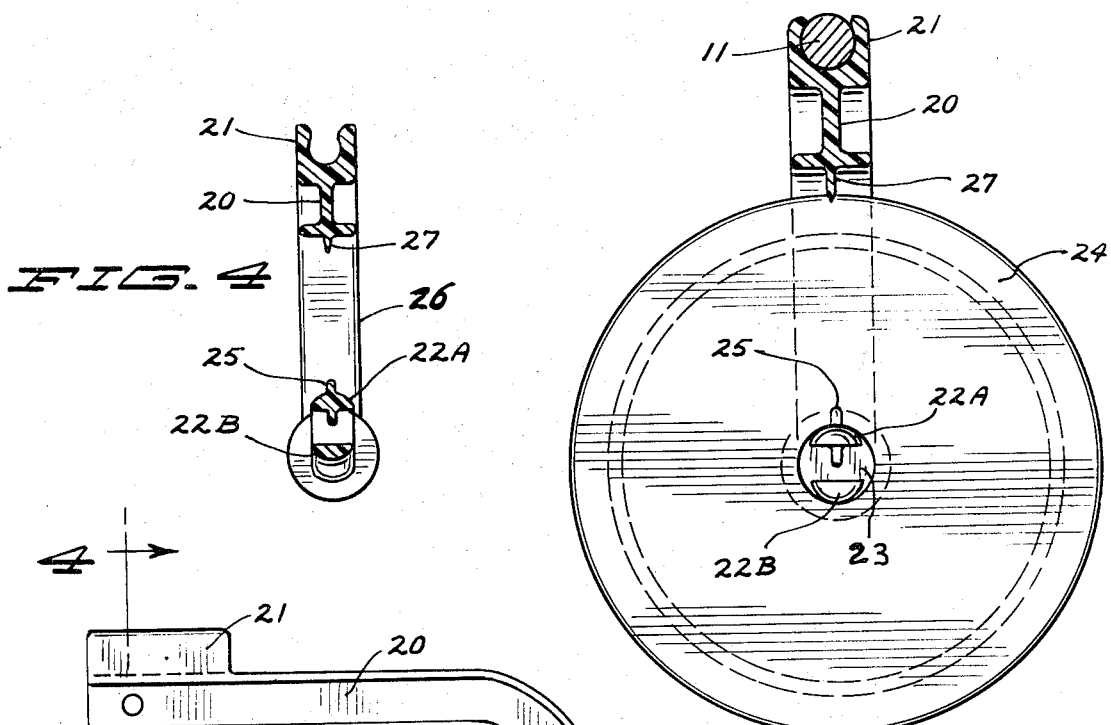
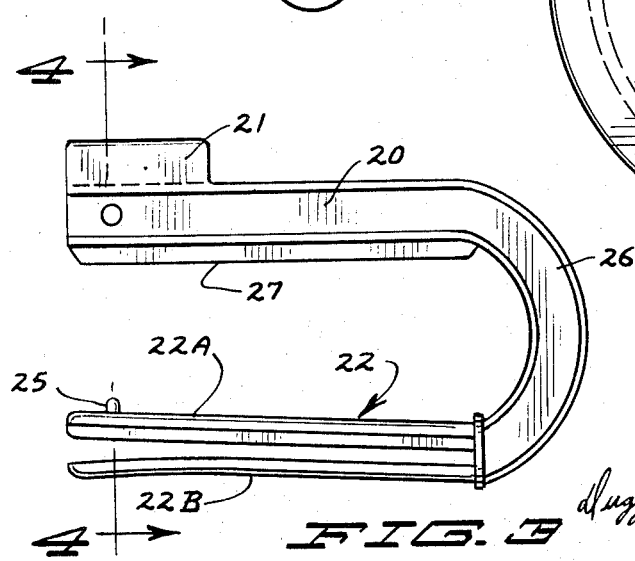
INVENTORS
CHARLES F. FOLEY
CHARLES D. McCARTHY
BY
Dugger Peterson Johnson & Westman
ATTORNEYS

HOLDER FOR TRANSFERRING FISHING LINE TO REEL

BACKGROUND OF THE INVENTION

The present invention relates to holders for holding new spools of fishing line directly onto a fishing rod so that the fishing line can be removed from the spool and wound onto a fishing reel.

In the prior art there has been many different winding devices for loading fishing reel spools from spools of new line. However most of these require separate winding devices, or complex attachments and generally have not been satisfactory.

SUMMARY OF THE INVENTION

The present invention relates to a simple rod attachment which will hold a new spool of fishing line, and permit the unwinding of the line from the spool of new line onto the spool of a fishing reel with the line properly oriented to prevent twists and kinks in the line. The device holds the line on the spool so that the line will not accidentally unwind from the spool. The attachment is easily clipped onto a fishing rod in the desired position so that the line can be removed easily. The spool holder may be made of molded plastic, and has means for retaining the spool in position.

The spool holder can easily be removed from the rod and replaced when necessary to change lines, and can be used with regular bait casting reels, spinning reels, spin cast reels, or any other type of reel that is desired.

BRIEF DESCRIPTION OF THE DRAWINGS

FIG. 1 is a fragmentary side elevational view of a rod showing the spool holder of the present invention installed thereon and a reel being loaded with line from the spool on the holder;

FIG. 2 is a sectional view taken as on line 2—2 in FIG. 1;

FIG. 3 is a side elevational view of the spool holder removed from the fishing rod; and FIG. 4 is a sectional view taken as on line 4—4 in FIG. 3.

DESCRIPTION OF THE PREFERRED EMBODIMENT

Referring to FIG. 1, line spool holder illustrated generally at 10 is shown installed on a fishing rod 11. The fishing rod has a handle portion 12. The rod may be of any conventional form that is desired. A fishing reel 13 is mounted onto the handle 12 of the rod and has a reel spool 14, controlled by a crank 15 in the usual manner. As shown, this is a spinning reel having a bail 16 with which the line is guided.

As shown, line spool holder 10 is a "U" shaped member, which is positioned on its side and includes a main leg or portion 20, having a resilient clip 21 thereon which fits over the rod 11 and retains the leg 20 on the rod. The clip 21 as shown in FIG. 4 and also in FIG. 2 is shaped to be part cylindrical and open on one side, and tapers from one end to the other in its longitudinal direction so that the clip 21 can be snapped onto a rod, and then slid lengthwise on the rod toward the handle to tighten up onto the rod surface. Most fishing rods of course, taper to smaller diameter toward the outer end of the rod, and the clip 21 is made so that the opening for the rod is larger in cross-sectional size adjacent the end closest to the reel and tapers to smaller dimension in direction away from the reel 13. The leg 20 also is integral with a support spindle 22 forming a line spool holder which as shown is split longitudinally, and has two portions 22A and 22B. The portions 22A and 22B are of size to slip within an opening 23 of a line supply spool 24, and a small retainer knob 25 holds the spool in position on the spindle 22. The line spool support spindle 22 is joined to the leg 20 with a curved section 26 molded integrally with the spindle and leg to form a "U" shaped structure that is open toward the reel 13.

A small rib 27 is molded onto the leg 20, and extends toward the spool support spindle 22 and along the length of the leg 20. This rib 27 is made so that it will engage the side flanges illustrated at 30 on the opposite sides of the spool 24. The line 31 is wound between these side flanges 30 on the line spool 24. As shown, the flange 30 closest to the reel 13 is urged against the rib 27 so that the line 31 coming from the supply spool 24 to the reel 13 has to pass between the rib 27 and flange 30. The resilient pressure between the rib 27 and flange 30 keeps the line from escaping from the spool until some pull is exerted on the line. This resilient force is kept quite light so that the line will pull out underneath the rib 27 when the reel 13 is wound, but will be retained on the spool so that it won't fall off the spool when no pull is being exerted. The thumb and forefinger of a fisherman illustrated at 32 can be used to hold the line 31 coming from the spool 24 to put a drag on the line and make it wind tightly on the reel spool 14. The line is merely held between the thumb and forefinger or, if desired a suitable friction drag member could be placed on the line in another manner.

The split sections 22A and 22B of the spool support spindle 22 are resiliently separated so that they are urged against the edges of the opening 23 and hold the upper section 22A away from section 22 B so that the knob 25 will prevent the spool 24 from coming off the spool support spindle.

The spool support spindle 22 can be bent toward the leg 20 of the spool holder to insure that adequate pressure is exerted by the flanges of the spool against the rib 27 to hold the line 31 in place.

The spool could be urged directly against the leg 20 or against the rod, if the spool support was constructed differently, for example if clip 21 was attached to member 26 and leg 20 was eliminated.

The device is easy to mold, easy to install on a rod, and does prevent the line from falling off the spool until it is pulled off. Because the spools of new line can be oriented properly so the line 31 can be wound in proper direction onto the reel spool 14 without putting any twists or kinks into the line.

It should be noted that the line spool does not rotate, but rather the line is pulled off the spool sideways or in other words, in axial direction of the spool. The spool 14 of a spinning reel does not rotate either, but the bail 16 properly winds the line onto the reel spool as the line is removed from the new line spool.

What is claimed is:

1. A member for retaining a spool having fishing line wrapped thereon in position to permit the line to be wound onto a fishing reel, said member comprising a spool support spindle, means to attach said spindle to a fishing rod holding a fishing reel to form an assembly, said spindle being of size to retain a spool of line thereon, said means to attach said spindle resiliently urging said spindle toward said rod to position wherein an edge of a spool on said spindle engages a portion of said assembly to thereby retain the line from passing off the side of said spool between said edge and the engaged portion of said assembly until external force is applied to said line to release said line one wrap at a time from said spool without rotating said spool.

2. The combination as specified in claim 1 wherein said means to attach said support spindle to said rod comprises a resilient clip adapted to receive said rod, said clip tapering in longitudinal direction to a smaller size in direction away from the normal position of the reel on said rod when the clip is on a rod.

3. The combination as specified in claim 2 wherein said member is a unitary substantially U shaped member made of a resilient plastic material.

4. A member for retaining a spool of fishing line in position to be wound onto a fishing reel, said member comprising a generally U shaped member including a first leg, and a second leg forming a spindle joined to the first leg at one end thereof, a rib longitudinally extending along said first leg and extending toward said second leg, means to attach said first leg to a fishing rod, said spindle being positioned when attached to said fishing rod substantially parallel to said fishing rod, said spindle being of size to retain a spool of fishing line thereon and said spindle being resiliently urged toward said first leg to a position wherein at least one edge of a spool of line on said spindle engages the edge of said rib, to thereby resiliently retain individual loops of line on said spool for passing off the side of said spool between said spool edge and the engaged portion of said rib until external force is applied to said line to pull the line between said edge and said rib.

5. A member for retaining a spool of fishing line in position to be wound onto a fishing reel, said member comprising a spool support spindle, means to attach said spindle to a fishing rod holding a fishing reel to form an assembly, said spindle being longitudinally split and including two longitudinally extending sections resiliently urged apart, a spool retaining lug on one of said legs to prevent a spool of line from coming off the spindle during normal use, said means to attach said spindle resiliently urging said spindle toward said rod to position wherein an edge of a spool on said spindle engages a portion of said assembly to thereby retain line from passing off said spool between said edge and the engaged portion of said assembly until external force is applied to said line to pull the line between the engaged portion and said edge.

* * * * *

PO-1050
(5/69)

UNITED STATES PATENT OFFICE
CERTIFICATE OF CORRECTION

Patent No. 3,776,485          Dated December 4, 1973

Inventor(s) Charles F. Foley et al.

It is certified that error appears in the above-identified patent and that said Letters Patent are hereby corrected as shown below:

Column 4, line 5, (Claim 4, line 15) "for" should be --from--; Column 4, line 8, (Claim 4, line 18) before "edge" insert--spool--; Column 4, line 16, (Claim 5, line 8) take out "legs" and insert--sections--.

Signed and sealed this 23rd day of April 1974.

(SEAL)
Attest:

EDWARD M. FLETCHER, JR.
Attesting Officer

C. MARSHALL DANN
Commissioner of Patents